R. De Charms,
Fire Plug,
Nº 19,022. Patented Jan. 5, 1858.
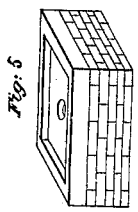
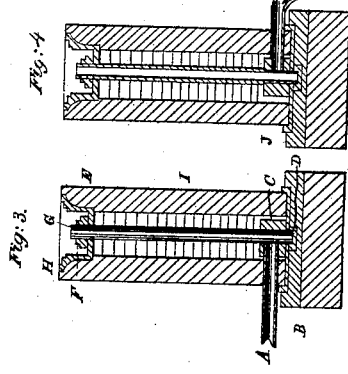
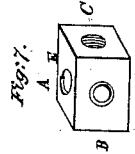
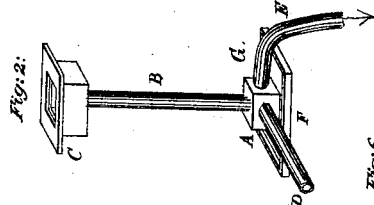
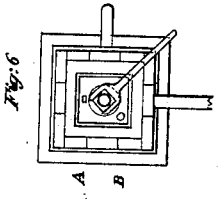
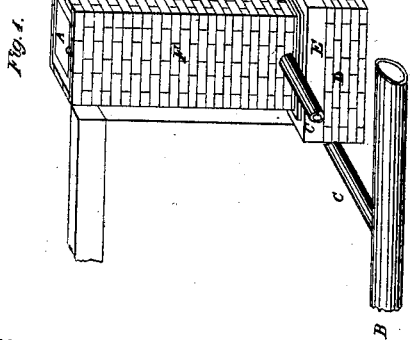
Witnesses.
J. S. Levers
Wm Edgar
Inventor
R. De Charms Sheet 2-2 Sheets.
R. De Charms,
Fire Plug.
N° 19,022.    Patented Jan. 5, 1858.
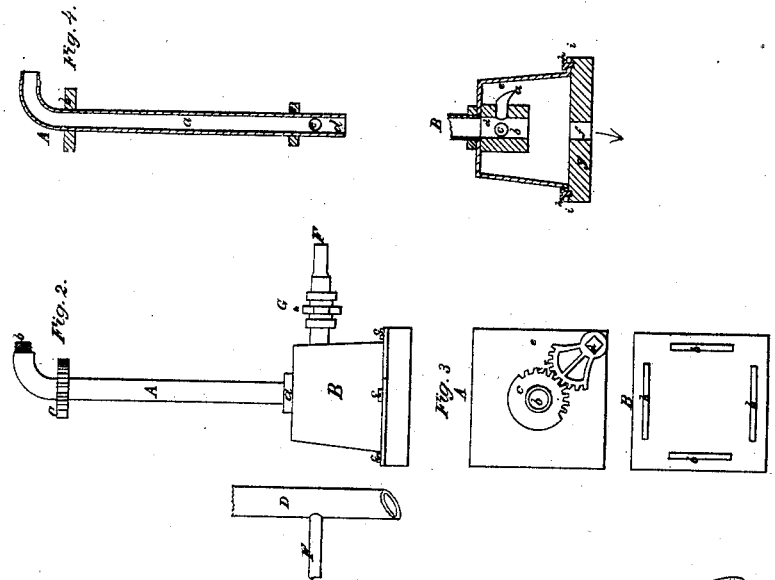
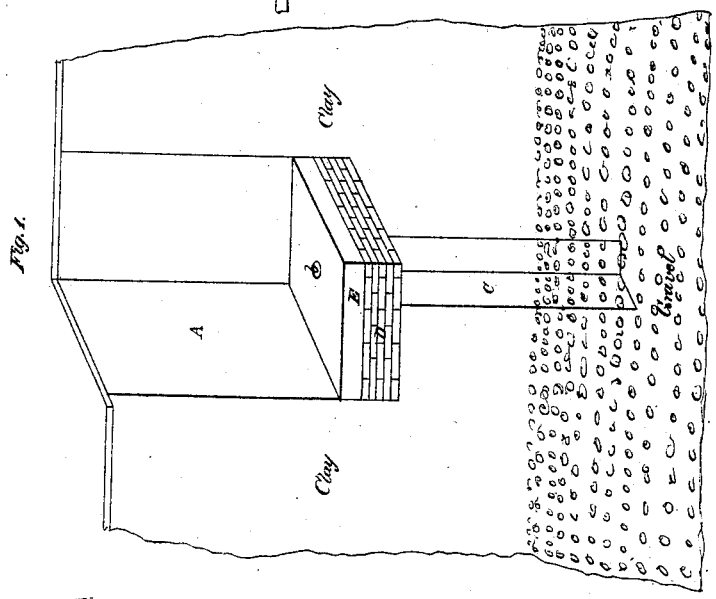
Witnesses.
J. S. Levers.
W^m E. Edgar.
Inventor:
R. De Charms.

UNITED STATES PATENT OFFICE.

RICHARD DE CHARMS, OF PHILADELPHIA, PENNSYLVANIA.

HYDRANT.

Specification of Letters Patent No. 19,022, dated January 5, 1858.

*To all whom it may concern:*

Be it known that I, RICHARD DE CHARMS, of the city of Philadelphia, in the State of Pennsylvania, have made a new and useful Improvement in Fire-Plugs and Hydrants, by which they are secured from frost in the coldest winters; and I do hereby declare that the following is a full, clear, and exact description of the same, reference being had to the accompanying drawings, which form part of this specification.

Figure 1, presents a view of an excavation; first, for the plug to be put down in; and, second, for the deriving shaft beneath it. Fig. 2, shows the plug in elevation above an air-tight chamber, (this chamber is designed to fit tight over F of Fig. 2, of first drawing, so as to include within it the bent waste-water pipe, E of the same, for conducting said water, through a hole in slab E of Fig. 1 of said drawings, into a shaft below it, for conducting the gravel beneath the clay, the nonrepresentation of which in said drawings, is that very serious defect in them, which it is the main object of this amended specification to remedy,) in which is a cube, with a vertical cylindric perforation, as a socket for the lower end of the plug, and also a similar perforation at right angles to the other for a bent waste-water pipe (as represented in Fig. 7 of the first drawings.) Fig 3, shows the upper and under sides of a top plate, (a modified form of Fig. 6 of first drawings,) on which the upper flange of the plug, (Fig. 8, c, first drawings,) rests and turns; and on which also a turning nut-gearing also appears, for rotating the plug in the quadrant of a circle.

Fig. 4 presents vertical sections of the lower or inner air-tight chamber, in which is the cube with vertical and horizontal perforations for the reception of the plug and waste pipe; and also of the plug when taken out of the socket in which it rotates in that cube.

I will now proceed to describe the construction and operation of this my improvement, so that others may construct it from my description of it.

In this specification the original drawings are designated Drawings No. 1, the additional ones for remedying their defects being understood to be Drawings No. 2.

Figure 1, shows the excavation of the clay in Drawings No. 1, Fig. 1, in which Fig. 1 of that drawing is set, and with all of that figure down to E, the stone slab, taken out; and also an additional excavation for a two-inch board shaft, for drawing the waste water away from the plug pipes, and conducting it through the clay down into the gravel.

Fig. 2, presents an elevation of the plug above a cast-iron air-tight chamber, the top of which is supposed to be the lower member of Fig. 2, of Drawings No. 1, with the pipes B, D, and E, taken out, and then turning it upside-down, and making a hole in the under side for the admission of the lower end of B.

Fig. 3 represents the upper and under sides of a top plate, on which the upper flange of the plug rests and turns.

Fig. 4, shows vertical sections of the plug as represented in Fig. 2 above; and also of the air-tight chamber beneath it, in this latter case by a plane passing through the side of the cube G of Fig. 2 of Drawings No. 1, at right angles to that side, and through the axis of the bent pipe E.

In Fig. 1, of Drawings No. 2 A is the plug excavation. This should be about two feet square by six feet deep. It is to be lined with stone slabs, (smeared with naphtha,) of an inch in thickness, let into inch furrows cut in E, the foundation slab, and into corresponding channelings, *b, b, b, b*, of the under side of the top plate, B, of Fig. 3—to form an outer air- and water-tight chamber: *b*, is a hole in the slab, for the waste-water to pass through into the shaft beneath: C, is the shaft excavation, for a shaft six inches square, made of thick boards, and sunk through the clay into the gravel: D, street main: E, supply pipe.

In Fig. 2, A is the plug pipe; with *a*, a lower flange to rest it on B; and *b*, a screw for hose attachment—to which a section of hose is constantly attached. C, is an upper flange, to rest and turn the pipe on the top plate; with indentations for a nut-gearing, (*d, e*, of A, Fig. 3,) by which the plug is rotated on its axis, in the quadrant of a circle, by means of a large T or auger wrench. B, is a cast-iron pyramidal air-tight chamber, with four perforated lugs, *c, c, c, c*, at the center of the bottoms of its four sides, with screws and nuts, to fasten it down to the slab E, on which it rests, for the purpose of covering the hole in the slab and husbanding the warmer air that breathes up, in very cold weather, from the shaft beneath, and nestles around the cubical socket-like receptacle of the plug and supply pipes within the chamber. E, is a flanged pipe-expansion cast on the upper part of one of the sides of the air chamber, for coupling with a similar flanged expansion of the supply pipe F, by a peculiar coupling, G, which I have myself invented for this especial purpose.

In Fig. 3, A, is the upper side of the top plate; $b$, is a horizontal section of the plug pipe just above its upper flange; $c$, that flange; $d$, nut for the auger-wrench; $e$ rotation gearing. B, is the under side of the top plate; with $b, b, b, b$, raised channeling, to fit over the upper edges of the four side-slabs.

In Fig. 4, A is the vertical section of the plug: $b$, the upper flange: $c$, the lower flange; $a$, the plug pipe; $d$, end of the plug that turns in its socket in the cube within the air-tight chamber; $e$, hole which lets on water when it is turned to the street pipe, and voids the waste-water, when it is turned to another hole in the other limit of the quadrant of the circle of its rotation. B, is a vertical section of the air-tight chamber by a plane passing through the side of the cube from which the waste-water issues, at right angles to it, through the axis of said issue: $a$, the cube within the chamber, into which the lower end of the plug fits, and turns, in a corresponding socket, in a quadrant of the circle of its rotation, from the side at which the supply pipe enters, to the side from which the waste-water issues; $b$, socket, in which the lower end of the plug turns; $c$, hole by which water from the supply pipe enters; $d$, hole by which the waste-water goes out; $e$, waste-water spout, pouring the water into the slab-hole for wastage; $f$, slab-hole; $g$, slab; $h, h$, two of the four lugs; $i, i$, nuts on screws.

From this descriptive display, it is manifest provision for preventing the plug's freezing is made, first, by removing the clay, or saturated earth, from around it, by sufficient excavation; second, by surrounding its upper and lower parts with dry air, which is one of the best nonconductors of heat,—by means of two air-tight chambers, the one within the other; third, by turning on, shutting off, and wasting, the water,—by the instrumentality of a virtual three-way-cock,—between four feet six inches and five feet below the pavement, where it can hardly freeze in our coldest winters; and fourth, by deriving from even that point, the waste-water, entirely through the clay, into the gravel beneath—where it must sink away without the possibility of freezing.

Such, therefore, is the operation of this improved device of mine for securing our street fire plugs and our yard hydrants from frost in our very coldest winters.

Therefore, the distinct features of novelty, in this my improvement of ordinary fire-plugs and hydrants, for which I claim a patent right of invention, are, first, the provision of twofold air-tight chambers,—one within the other,—the outer water-tight as well as air-tight; by which I keep the air, as a nonconductor of heat, dry around the plug and hydrant pipes; second, the provision of a shaft below said chambers, by which I draw off the waste-water,—so as to prevent its accumulating around said pipes,—and conduct it down, through the clay, into the gravel; third, making an improvement of the three-way-cock principle of application, for combining all of the three functions, of letting on, shutting off and wasting water, by the simple vertical motion of the single member of such a cock, namely, the tap of a common faucet.

I do not claim to have invented a plug and hydrant, operating on the principle of wasting water by a three-way-cock; but I merely claim to have improved them, (as they have been, from time immemorial, constructed on that principle,) by a very peculiar simplification of their operation. For in respect to so much of my present improvement as pertains to the voiding of the waste-water, that which I do claim, as the novelty of my invention, or device, is—

The making the solid rod of the three-way-cock, by which it is operated, a tube, bent at the top, so as to let on, stop off, and waste, the water, by the simple turning of that tube as the tap of a faucet. This combining of the first two with the last of these three functions in the vertical motion of a single member of the three-way-cock, is what I claim as the gist of my improvement of that hydraulic machine, and this feature of my claim, together with the provision of the two air-tight chambers, and the shaft for deriving the waste-water as well from the outside as from the inside of the plug or hydrant, substantially as herein before set forth, I desire to have secured to me by Letters Patent.

R. DE CHARMS.

Witnesses:
G. YORKE ATLEE,
THOS. S. CLARK.